Figure 1:
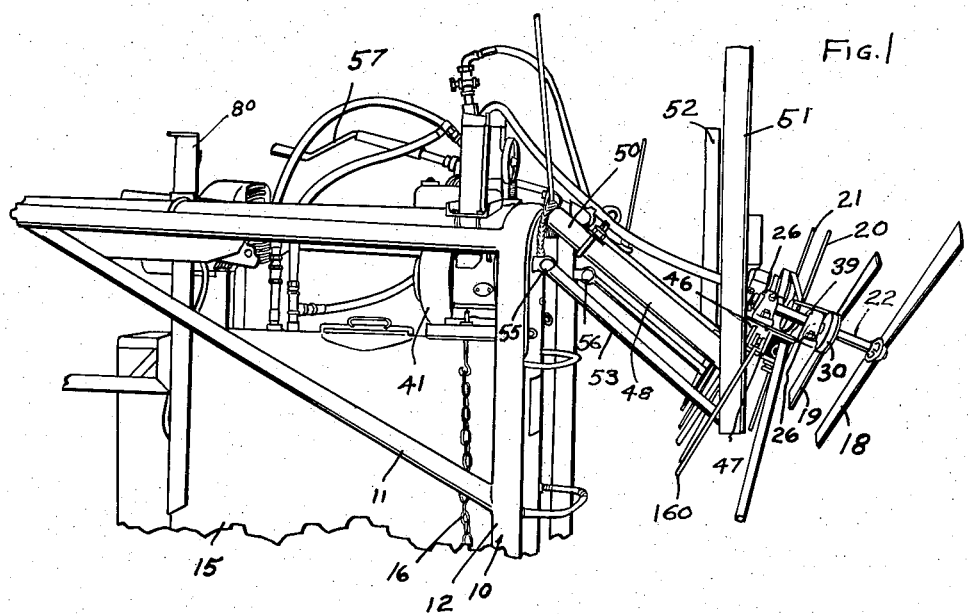

March 20, 1962 H. J. ACKERMANN 3,025,653

CORN TOPPER

Filed March 17, 1960

INVENTOR.
HARRY J. ACKERMANN
BY

United States Patent Office 3,025,653
Patented Mar. 20, 1962

3,025,653
CORN TOPPER
Harry J. Ackermann, Reinbeck, Iowa
Filed Mar. 17, 1960, Ser. No. 15,566
2 Claims. (Cl. 56—53)

This invention relates to machines for removing the tassels and upper stalks from corn and, more particularly, to machines for removing the tassels and the upper portion of the stalk from a corn stalk.

During wet years, the corn in fields does not dry out properly after it has matured and the tops of the stalks shade the ears. It has been discovered that if the upper portions of the corn stalks above the corn ears are removed after the upper stalks of the corn have matured, the corn will dry out better before it is harvested and will not be as likely to spoil after it has been gathered and stored.

It is accordingly, an object of the invention to provide an improved machine for removing the upper parts of corn stalks.

Another object of the invention is to provide an improved corn topper.

Still another object of the invention is to provide an improved machine for topping plants.

A further object of the invention is to provide a corn topping machine which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
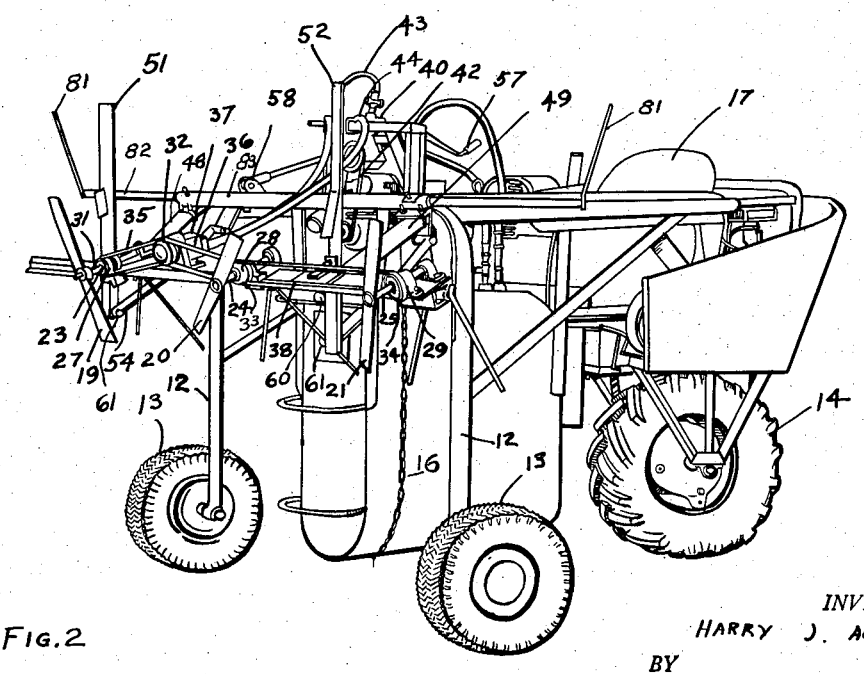

In the drawing:

FIG. 1 is a right side view of a corn topping machine according to the invention; and FIG. 2 is an isometric view of the corn topping machine showing the hydraulic driving motor and other related parts.

Now with more particular reference to the drawing, a corn topping machine is shown mounted on a high clearance tractor 10 having a frame 11. The tractor 10 is supported on depending carrying wheels 13 attached to the U-shaped ends of a frame 12. The tractor 10 also has a driving wheel 14.

A tank 15 is provided for carrying spraying fluids when the machine is used as a sprayer or for auxiliary purposes. The tank 15 is supported by angle irons 80 welded to the tank 15 and the frame. A chain 16 supports the platform to which an engine 41 is supported. The chain 41 is attached to the platform and to the tank 15.

The driving wheel 14 is driven by a suitable engine and an operator's seat 17 is provided above the driving wheel 14.

Generally straight, propeller like, blades 18, 19, 20, and 21 are provided for cutting off the corn tops. These blades are carried on their respective shafts 22, 23, 24, and 25 which are in turn supported on their respective bearings 26, 27, 28, an 29. The shafts 22, 23, 24, and 25 have pulleys 30, 31, 33, and 34 thereon which are driven by means of V-belts 35 and 36 driven by a pulley 32. The V-belts 35 and 36 connect the shafts 23 and 24 to a hydraulic motor 37 and belts 38 and 39 connect the shafts 23 and 24 to the shafts 22 and 25 so that all of the blades are driven from the hydraulic motor 37 by the V-belt shown.

The hydraulic motor 37 is driven by a supply of hydraulic fluid from a pump 40. The pump 40 is driven by the gasoline engine 41 which is connected to the pump 40 by means of a belt 42. Hydraulic fluid flows through the motor 37 through a hose 43 and back to the pump 40 through a hose 44.

The bearings 26, 27, 28, and 29 are supported on a plate 46 which is attached to a rectangular tubular member 47. The tubular member 47 is supported on outwardly extending legs 48 and 49 of an interger U-shaped member 50 by means of vertical guide members 51 and 52. The members 51 and 52 are parts of the mechanism ordinarily used to carry spraying equipment. The tubular member 47 can be adjusted up or down on the guide members 51 and 52. The front ends of the legs 48 and 49 are pivotally attached to the members 51 and 52 at 60.

Links 53 and 54 have their front ends pivotally attached to the bottom ends of the members 51 and 52 at 61 and their inner ends pivotally attached to the tractor frame 12 at 55 and 56. A crank 57 is connected to a member which is in turn connected to a link 58 on the U-shaped member 50. Therefore, when the crank 57 is rotated, the legs 48 and 49 of the U-shaped member 50 swing upwardly to raise or lower the blades 18, 19, 20, and 21.

It will be noted that the blades always maintain their same angle to the vertical which is approximately thirty degrees; that is, the upper parts of the blades tilt rearwardly and upwardly and the lower parts forwardly and downwardly at approximately thirty degrees to the vertical that is, displaced slightly from a vertical plane. Therefore, as the corn is pushed over by the tractor running over it, the blades will cut it off rather than slice through the stalks as would happen if the blades ran in the vertical plane. The machine is much less dangerous than machines having blades which swing in a horizontal plane.

Guide rods 160 diverge downwardly from each other and form a generally downwardly opening V-shaped member having the shafts 22, 23, 24, and 25 at the apex of the V so that the corn stalks are guided toward the cutting blades. Rows at the side of the tractor are pushed over by bars 81 attached to a support 82 which is telescopically received in a tube 83. The tube 83 is fixed to the tractor frame.

Since the blades run in a substantially vertical position, they are not as likely to injure persons moving around them as would be the case with blades running in a horizontal plane.

The foregoing specification sets forth the invention in its preferred practical forms but the structure shown is capable of modification within a range of equivalents without departing from the invention which is to be understood as broadly novel as is commensurate with the appended claims.

The embodiments of the invention in which an exclusive property or privilege is claimed are defined as follows:

1. A machine for removing the tops of plants comprising a machine frame having ground engaging wheels thereon, a blade support frame, means to adjust said blade support frame vertically, horizontally and laterally spaced shafts supported on said blade support frame, a hydraulic motor, means operatively connecting said hydraulic motor to said shafts, and a generally straight, propeller like blade on each said shaft, said blades being rotatable in a plane disposed approximately thirty degrees to the vertical.

2. A machine having a frame, ground engaging wheels on said frame, a U-shaped member having the intermediate part thereof pivotally connected to said frame and the legs of said U-shaped member connected to a blade support frame, link members having one end thereof connected to said machine frame and the other end connected to said blade support frame, a tubular member vertically adjustably supported on said blade support frame, horizontally spaced shafts supported on said tubular member, said shafts being moved in a plane approximately thirty degrees to a vertical, a generally straight, propeller like blade on each said shaft, a hydraulic motor on said blade support frame operatively connected to said shafts to rotate said blades, and a hydraulic pump on said machine for driving said hydraulic motor.

References Cited in the file of this patent

UNITED STATES PATENTS

| | | |
|---|---|---|
| 1,869,394 | Sikma | Aug. 2, 1932 |
| 2,516,794 | Neel | July 25, 1950 |
| 2,842,926 | Nelson | July 15, 1958 |
| 2,920,434 | Ingram | Jan. 12, 1960 |